Patented Mar. 23, 1954

2,673,213

UNITED STATES PATENT OFFICE 2,673,213

POLYALKYLENE POLYAMINO ACIDS

Frederick C. Bersworth, Framingham Center, Mass.

No Drawing. Application June 3, 1952,
Serial No. 291,578

8 Claims. (Cl. 260—500)

This invention relates to polyalkylene polyamino acids and more particularly to polyalkylene polyamino acids capable of reacting as metal ion chelating compounds and has for its object the provision of such metal ion chelating polyalkylene polyamino acids which are also capable of reacting chemically with mineral and fatty acids to form acid salts therewith which are also metal ion chelating compounds.

Another object of the invention is to provide polyalkylene polyamino acids conforming to the following structural formula:

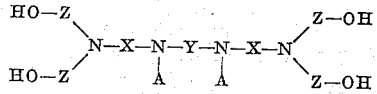

wherein Y is a bivalent alkylene group containing from 2 to 3 carbon atoms; X is a bivalent alkylene group containing from 4 to 12 carbon atoms which may be interrupted by ether oxygen atoms; Z is a bivalent alkylene group containing from 2 to 6 carbon atoms which may be either straight chained or branched; and A is one of the groups consisting of $CH_2 \cdot COOH$;

$CH_2 \cdot CH_2 \cdot COOH$; $CH_2 \cdot PO(OH)_2$, $CH_2 \cdot CH_2 \cdot PO(OH)_2$, $CH_2 \cdot CH_2 \cdot SO_3H$ and the alkali metal and ammonium salts thereof.

A further object is to provide a new type of polyalkylene polyamino acid metal ion chelating agents that contain independently reactive tertiary amino nitrogens.

Still another object is to provide a dual functioning metal ion chelating agent.

Other objects will be apparent as the invention is more fully hereinafter disclosed.

In accordance with these objects I have discovered that when an alkylene polyamino acid contains at least four amino nitrogens spaced apart by alkylene groups, the chemical activity of the compound is markedly changed by varying the number of carbon atoms in the spacing alkylene groups. I have found that when the alkylene group between two of the inner amino nitrogens contains from 2 to 3 carbon atoms and the alkylene group spacing the other amino nitrogens from the two spaced inner amino nitrogens contains at least four but not over 12 carbon atoms, the two inner spaced amino groups are reactive as diamines and the end spaced amino nitrogens react chemically as tertiary nitrogens independently of the diamine reactive inner amino groups.

Based on this discovery I have formed the polyalkylene polyamino acids conforming to the above generic formula in which the A groups attached to the two inner spaced nitrogens function chemically as metal ion chelating groups and the end amino nitrogens are capable of independent chemical reaction with mineral and fatty acids as tertiary nitrogens to form acid salts therewith, many of which are of great utility in the art.

The independent chemical activity of the compounds of the present invention may be best illustrated by the following formula, using the acetic derivatives of the amino acid as a specific example:

(1) 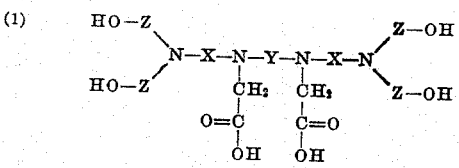

This diacetic amino acid will react with a divalent metal ion to form a chelate compound conforming to the following structure:

(2) 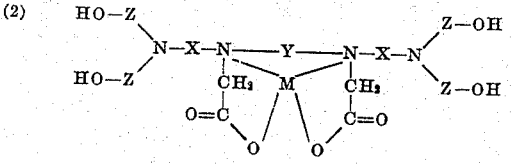

The end hydroxy-amino nitrogen groups, however, are separately and independently reactive chemically with mineral and fatty acids using stearic acid as an example, to form compounds of the following structure:

(3) 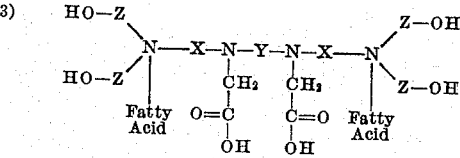

The compound of Formula 3 is essentially a polyalkylene polyamino acid soap compound which in aqueous solution functions as a chelating compound substantially as indicated in Formula 2. The carboxylic acid groups of this fatty acid compound may be neutralized by alkali metal and ammonium ions without interfering with the chelating properties of the acetic acid groups.

In the compounds of this invention, stabilization of the end amino nitrogens of the polyalkylene polyamino acids with hydroxy-alkylene substituent groups is essential to develop therein the tertiary chemical activity of the amino nitrogens.

For the purpose of this invention, the limitations imposed upon the various alternative values of X, Y, Z and A are not arbitrarily selected. On the contrary, bearing in mind that the preferred compounds of this invention are designed to contain a plurality of "spaced" amino nitrogen groups, the spacing between two of the interior nitrogens being that imparting thereto the chemical reactivity of a diamine, and the spacing between these interior nitrogens and the end nitrogens being that imparting to the nitrogen atoms thereof the chemical reactivity of a tertiary nitrogen independently of the interior nitrogen atoms, thereby adapting the the compound to act as sequestering agents particuarly in the chelating of heavy metal ions, and, more particularly, to serve as intermediates in further syntheses based on the tertiary chemical activity of the end amino nitrogens, these limitations are of the essence of the present invention.

In order to permit the independent function of the nitrogen atoms in the end amino groups as tertiary nitrogens the X groups spacing these amino groups from the interior diamine reacting nitrogens must contain at least four carbon atoms. To obtain maximum sequestering ability, for heavy metal ions, the Y group spacing the interior diamine reacting nitrogens must contain not less than two nor more than three carbon atoms, and the A groups of the compound must be either —CH₂COOM or —CH₂CH₂COOM to allow the formation of 5 or 6 membered rings during sequestration. Adequate water solubility is a desirable but not a necessary property for these compounds. Other things being equal, with increase in the size and weight of the various radicals X, Y and Z the water solubilty of the polyalkylol polyalkylene polyamino acids decreases. Limits therefore must be set for the sizes of these various radicals and these limits must vary with variations in the nature of the radicals. The presence of the solubilizing hydroxyl and carboxyl groups in the compounds, however, permits a wide variation in the value of the radicals X, Y and Z before water solubility is diminished to an undesirable extent. Similarly, if the X groups possess an ether linkage they can be of greater size and weight than if they are alkylene groups. The series of compounds wherein the A groups consist of phosphonic and sulfonic acids vary similarly in their physical properties with variation in the size and type of X and Y radicals present therein.

The compounds of this invention are obtainable by any of several known methods, for example, conversion of the appropriate polyalkylol polyalkylene polyamines of the general formula:

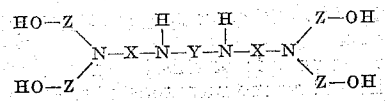

prepared according to my copending application Serial No. 291,577 filed June 3, 1952, to the diacetic acid derivative by the process set forth in my U. S. Patent No. 2,407,645, issued September 17, 1946.

Another method which may be employed to produce the compounds of this invention consists in reacting one molecular proportion of the proper symmetrical alkylene diamine dialkyl phosphonic or sulfonic or dialkanoic acid, such as N,N'-ethylene diamine diacetic acid, with two molecular proportions of a suitable halogen substituted alkyl dialkanolamine, for example, N-(4-chlorobutyl)-diethanolamine under conditions such as to insure a substantial yield of the desired product. This method is well suited for the introduction of the —CH₂CH₂COOM group since other methods, for example, the action of chloropropionic acid and its salts upon the polyalkylol polyalkylene polyamines tend to form ether type acids.

The —CH₂CH₂COOM group may also be introduced by cyanoethylation of the proper polyalkylol polyalkylene polyamine followed by hydrolysis of the resulting dipropionitrile derivative.

Still another method of preparation comprises in reacting one molecular proportion of a symmetrically substituted halogen alkyl or alkoxyalkyl diamine dialganoic acid (or corresponding dialkyl phosphonic or sulfonic acid) or its alkali metal salts, for example, N,N'-di-(2-chloroethoxyethyl)-ethylene diamine diacetic acid, with two molecular proportions of an appropriate dialkanolamine, such as, diethanolamine.

Although these compounds can be prepared by methods other than those described above and also by modifications which will appear to those skilled in the art, I prefer to use the procedures followed in the specific examples hereinafter given since they are easily carried out, require no complicated apparatus and involve a minimum of manipulative steps.

In order to understand this invention more clearly the following examples are given:

EXAMPLE I

One mol of N,N'-di-(2-iminodiethanolethoxyethyl)-ethylene diamine was treated according to my U. S. Patent No. 2,407,645 issued September 17, 1946. This method, briefly, comprises adding two mols of formaldehyde and two mols of sodium cyanide slowly and in small balanced quantities under strongly alkaline conditions to the diamine and heating the mixture with rapid agitation. Evaporation of the reaction mixture gave a pale viscid mass consisting of the disodium salt of N,N'-di-(2-iminodiethanol-ethoxyethyl)-ethylene diamine diacetic acid having the formula:

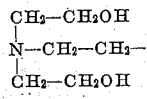
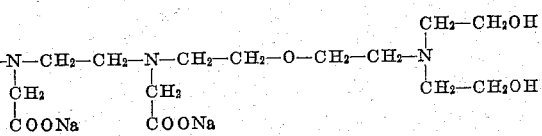

EXAMPLE II

To 0.1 mol of the disodium salt of N,N'-ethylene diamine dipropionic acid in 100 ml. of water at slow reflux there was added over a two hour period 0.2 mol of 4-bromobutyldiethanolamine. The mixture was heated at gentle reflux for an additional four hours.

Evaporation of the aqueous solution to dryness under reduced pressure gave a pale yellow viscous liquid soluble in hot alcohol consisting of the compound N,N'-di-(4-iminodiethanolbutyl)-ethylene diamine dipropionic acid having the following formula:

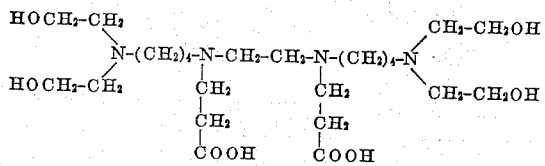

EXAMPLE III 0.1 mol of N,N'-di-(8-iminodibutanol-octyl)-

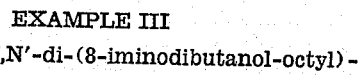
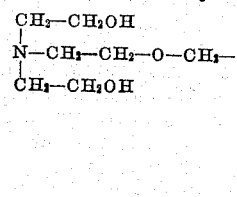

isopropylene diamine was treated according to my U. S. Patent No. 2,407,645, issued September 17, 1946. Evaporation of the reaction mixture to dryness under reduced pressure gave a viscid yellow product consisting of the disodium salt of N,N'-di-(8-iminodibutanol-octyl) - isopropylene diamine diacetic acid having the formula:

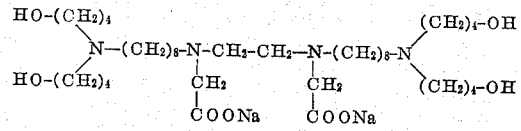

Its aqueous solution sequesters heavy metal ions over a wide pH range and is compatible with soap.

EXAMPLE IV

To 0.1 mol of the disodium salt of N,N'-ethylene diamine dipropionic acid in 100 ml. of water there was added over a four-hour period 0.2 mol of N-(2-chloroethoxyethyl) diethanolamine. The mixture was refluxed for an additional four-hour period after which time it was evaporated to dryness under reduced pressure. Repeated alcohol extraction of the residue followed by evaporation of the alcohol gave an extremely viscous yellow oil consisting of the compound N,N'-di-(2-iminodiethanolethoxyethyl)-ethylene diamine dipropionic acid having the formula:

CH₂—CH₂OH
|
N—CH₂—CH₂—O—CH₂—CH₂—N—CH₂—CH₂—N—CH₂—CH₂—O—CH₂—CH₂—N
|                                                    |      |                                       |
CH₂—CH₂OH                                          CH₂    CH₂                                     CH₂—CH₂OH
                                                   |      |
                                                  CH₂    CH₂
                                                   |      |
                                                  COOH   COOH

EXAMPLE V 0.2 mol of N,N'-di-(4-iminodiethanol-butyl)-isopropylene diamine was treated according to my U. S. Patent No. 2,407,645, issued September 17, 1946. Evaporation of the reaction mixture to dryness gave a yellow solid consisting of the disodium salt of N,N'-di-(4-imino-diethanol-butyl)-isopropylene diamine diacetic acid having the formula:

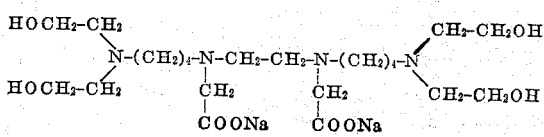

EXAMPLE VI

To a gently refluxing solution of 0.5 mol of N,N'-di-(2-iminodiethanol-ethoxyethyl) - ethylene diamine in 500 ml. of alcohol containing 1.0 mol of sodium hydroxide, there was added over a two-hour period 1.0 mol of chloroethyl phosphonic acid. After four hours of refluxing, the sodium chloride was removed by filtration and the alcohol by distillation. The partially crystalline yellow product consisting of the compound N,N'-di-(2-iminodiethanol-ethoxyethyl) - ethylene diamine diethyl phosphonic acid is soluble in water and alcohols and has the formula:

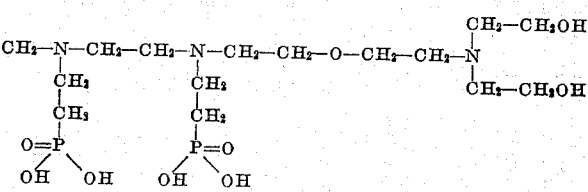

EXAMPLE VII

To a gently refluxing solution of 0.5 mol of N,N'-di(8-iminodibutanol-octyl)-isopropylene diamine in 500 ml. of alcohol containing 1.0 mol of sodium hydroxide there was added gradually over two hours, 1.0 mol of chloroethyl sulfonic acid. After four hours of refluxing, the sodium chloride was removed by filtration and the alcohol by distillation. The viscid yellow residue consisting of the compound N,N'-di-(8-iminodibutanol-octyl)-isopropylene diamine-diethyl sulfonic acid is soluble in water and alcohols and has the formula:

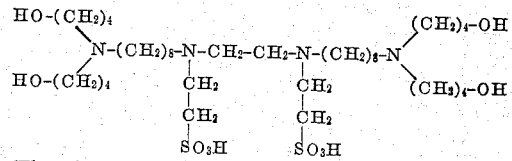

The following symmetrical alkylene diamine dialkanoic dialkyl phosphonic and dialkyl sulfonic acids and their alkali metal salts exemplify the class of starting materials useful for making the compounds of this invention: N,N'-isopropylene diamine diacetic acid and its alkali metal salts, N,N'-ethylene diamine diacetic acid and its alkali metal salts, N,N'-trimethylene diamine diacetic acid and its alkali metal salts, N,N'-ethylene diamine dipropionic acid and its alkali metal salts, N,N'-isopropylene diamine dipropionic acid and its alkali metal salts, N,N'-trimethylene diamine dipropionic acid and its alkali metal salts, N,N'-ethylene diamine dimethyl phosphonic acid, N,N'-ethylene diamine di-ethyl phosphonic acid, N,N'-isopropylene diamine di-propyl phosphonic acid, N,N'-trimethylene diamine di-ethyl phosphonic acid, N,N'-ethylene diamine diethyl sulfonic acid and N,N'-isopropylene diamine diethyl sulfonic acid.

As suitable halogen substituted alkyl or alkoxyl alkyl dialkanolamines the following compounds may be employed; N-(2-chloroethoxyethyl)-diethanolamine, N - (3-chloropropoxyethyl) - diethanolamine, N-(6-bromohexyl)-diisopropanolamine, N-(4-chlorobutoxyethyl)-diisopropanolamine, N-(4-chlorobutyl)-diethanolamine, N-

(omega-dodecyl) - diethanolamine and N - (4-chlorobutyl)-dipropanolamine, and the corresponding bromo compounds thereof.

Suitable halogenated alkyl phosphonic acid to be employed are chloromethyl phosphonic acid, chloroethyl phosphonic acid, chloropropyl phosphonic acid and their methyl and ethyl esters. A suitable halogenated alkyl sulfonic acid, for example, is chloroethyl sulfonic acid or its alkali metal salts.

As will be seen from the above disclosure the new compounds herein disclosed may be made from the following starting materials; namely, polyalkylol polyalkylene polyamines, having the structure:

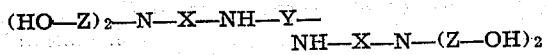

symmetrical alkylene diamine dialkanoic acids or their alkali metal salts; and halogen substituted alkyl or alkoxy alkyl dialkanolamines.

The polyalkylol polyalkylene polyamines suitable as starting materials for the new compounds include the following: N,N'-di-(2-iminodiethanol-ethoxyethyl)-ethylene diamine, N,N'-di-(2-iminodiethanol - ethoxyethyl) - isopropylene diamine, N,N'-di-(2-iminodiethanol-ethoxyethyl)-trimethylene diamine, N,N' - di - (3 - iminodiethanol - isopropyloxyethyl) - ethylene diamine, N,N' - di - (4 - iminodiethanol - butyloxyethyl) - ethylene diamine, N,N' - di-(4 - iminodiethanolbutyl) -trimethylene diamine, N,N' - di - (3-iminodipropanol - isopropyloxyethyl) - ethylene diamine and N,N' - di - (omega - iminodiethanol-dodecyl) - ethylene diamine.

In addition to the alkyene diamines and alkylene diamine dialkanoic acids and their salts mentioned above, compounds using 1,2-diamino-cyclohexame or 1,2-diamino-cyclohexane, N,N'-diacetic acid or its salts may be used.

A preferred compound of this series is produced from 1,2-diaminocyclohexane and N-(4-chlorobutyl)-diethanolamine and then by conversion of the polyalkylol polyalkylene polyamine derivative to the diacetic acid derivative by the process as set forth in my U. S. Patent No. 2,407,645, issued September 17, 1946, and is represented by the following formula:

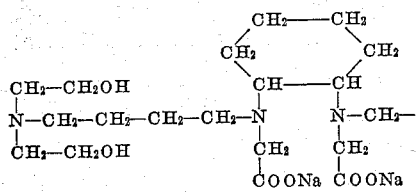

This compound is an excellent sequestering agent for heavy metal ions and possesses two active tertiary nitrogen atoms in the two end amino groups which are capable of forming soap-like products with fatty acids as do the other compounds of this invention.

The bi-functional alkylene polyamino acids of this invention possess many interesting and useful properties primarily as sequestering agents for heavy metal ions, such as copper and nickel, and as intermediates in the production of thus far unobtainable compounds based on the chemical activity of the tertiary nitrogens and have, therefore, many diverse applications. As indicated above, the most important new chemical property of these compounds is that they may serve as intermediates in the production of soap-like amino acid chelating compounds of the general formula:

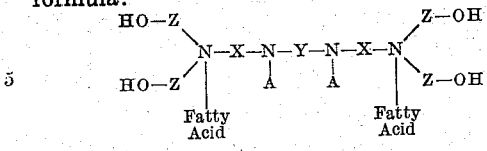

These soap-like amino acid compounds are readily formed by adding a fatty acid to an aqueous solution of the poly-alkylol polyalkylene polyamino acid in the relative molar proportions indicated and heating the solution to complete formation of the soap-like amino acid compound.

It is well known that a serious allergy exists in many people toward soaps. Neutral soaps have been recommended but soaps having a pH below 10.5 are not satisfactory detergents. These soap-like amino acid compounds are water soluble and of near neutral pH, possess excellent foaming action even in the presence of heavy metal ions and overcome the necessity of a high pH with its subsequent ill effects, and generally are non-toxic.

The compounds of the present invention are useful also in the leather and textile industries, in cosmetic and soap compositions, polishes, glass and metal cleaning preparations, as antioxidants, as additives to lubricants and in numerous other applications for which metal ion chelating and sequestering agents generally heretofore have been commonly employed.

Having hereinabove disclosed the present invention generically and specifically and having given a plurality of specific examples to illustrate the same, it is believed apparent that the invention may be widely modified without essential departure therefrom, and all such modifications and adaptations of the invention are contemplated as may fall within the scope of the following claims.

What I claim is:

1. Chemical compounds corresponding to the general formula:

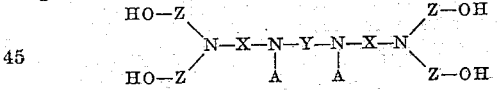

wherein Y is a bivalent alkylene radical of two to three carbon atoms selected from the group consisting of unsubstituted and substituted alkylene radicals containing at least one alkyl group; X is a bivalent alkylene radical of four to twelve carbon atoms selected from the group consisting of unsubstituted and substituted bivalent alkylene radicals containing at least one alkyl group and the same interrupted by ether oxygen atoms; Z is a member of the group consisting of bivalent alkylene radicals of two to six carbon atoms selected from the group consisting of straight chained and branched chained radicals; A is a member of the group consisting of —$CH_2COOH$, —$CH_2CH_2COOH$, $CH_2P(OH)_2$, $CH_2 \cdot CH_2 \cdot PO(OH)_2$, $CH_2 \cdot CH_2 \cdot SO_3H$ and their ammonium and alkali metal salts.

2. The compound N,N'-di-(2-iminodiethanol-ethoxyethyl)-ethylene diamine diacetic acid conforming to the formula:

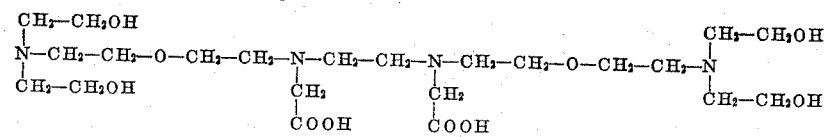

3. The compound N,N'-di-(4-iminodiethanol-butyl)-ethylene diamine dipropionic acid conforming to the formula:

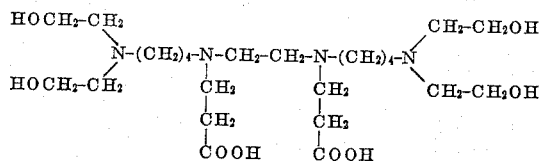

4. The compound N,N'-di-(8-iminodibutanol-octyl)-isopropylene diamine diacetic acid conforming to the formula:

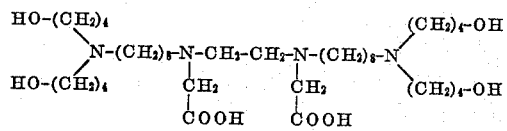

5. The compound N,N'-di-(2-iminodiethanol-ethoxyethyl)-ethylene diamine dipropionic acid having the formula:

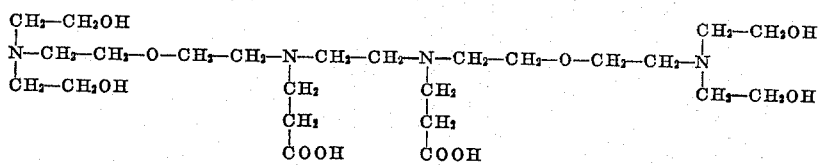

6. The compound N,N'-di-(4-imino-diethanol-butyl)-isopropylene diamine diacetic acid having the formula:

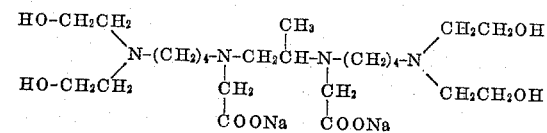

7. The compound having the formula:

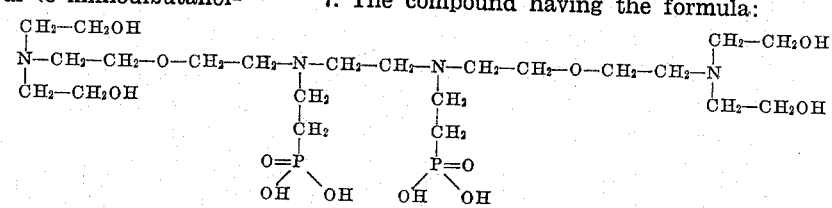

8. The compound having the formula:

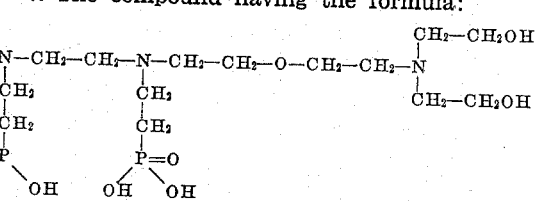

FREDERICK C. BERSWORTH.

References Cited in the file of this patent
UNITED STATES PATENTS

| Number | Name | Date |
|---|---|---|
| 2,176,441 | Ulrich et al. | Oct. 17, 1939 |
| 2,316,606 | Loder et al. | Apr. 13, 1943 |
| 2,316,636 | Teeters | Apr. 13, 1943 |
| 2,407,645 | Bersworth | Sept. 17, 1946 |
| 2,413,856 | Bersworth | Jan. 7, 1947 |
| 2,428,353 | Bersworth | Oct. 7, 1947 |
| 2,532,391 | Bersworth | Dec. 5, 1950 |
| 2,609,390 | Bersworth | Sept. 2, 1952 |